Patented Nov. 9, 1937

2,098,362

UNITED STATES PATENT OFFICE 2,098,362

CELLULOSE ACETATE COMPOSITION

Joseph Rivkin, Pittsburgh, Pa., assignor to The Neville Company, a corporation of Pennsylvania No Drawing. Application November 27, 1936, Serial No. 113,011

4 Claims. (Cl. 106—40)

This invention relates to cellulose acetate solution.

In the production of phenol-modified, coumarone-type resins by effecting polymerization of the polymerizable reactives found in crude solvent naphtha, accompanied by interreaction with one or more of the phenols or phenolic substances reactive with the bodies present in or formed by polymerization in the crude solvent naphtha, the initial product is usually a relatively soft resin. This resin, produced, for example, in accordance with the procedure described in my co-pending application, Serial No. 53,514, now Patent No. 2,077,009, granted April 13, 1937, is susceptible of separation, as by steam distillation, into a solid resin and a heavy viscous, oily substance consisting of the lower molecular weight bodies produced as a result of the resin-forming reaction described above. When properly conducted to that end, as by polymerization with sulphuric acid, a sulphonic acid, or under the conditions defined in my above-noted application, the products resultant from polymerization and accompanying phenolic interreaction possess to a marked degree the quality of solubility in alcohol. This quality being a characteristic of the solid resin of this sort melting between 90° C. and 100° C. is possessed in higher degree by the viscous, oily substance which is separated from the solid resin.

I have made the further discovery that this fluid, resinous material, or phenolic heavy oil, is, when heated, a solvent for cellulose acetate, and that there may be made from it cellulose acetate solutions within a relatively wide consistency range.

In order that the best results may be obtained in utilizing phenolic heavy oil as a solvent for cellulose acetate, it is desirable that the phenolic heavy oil, separated from solid phenol-modified coumarone resin, be subjected to redistillation. In redistilling the phenolic heavy oil under a pressure of one millimeter, the cut which distills over below 160° C. is comparatively low in solvent power for cellulose acetate, and the material remaining in the still at a temperature of 200° C. is a solid, resinous material. While, therefore, it is possible to utilize as a solvent for cellulose acetate an unfractionated body of phenolic heavy oil, I prefer to fractionate; and to use as a solvent the cut of phenolic heavy oil distilling over within the temperature range of 160° C. to 200° C.

In making a solution of cellulose acetate in the phenolic heavy oil, I commingle the two with agitation, and under moderately elevated temperature. The following example gives approximately the percentage content of cellulose acetate in phenolic heavy oil under simple operating conditions.

Example No. 1

Taking phenolic heavy oil and cellulose acetate in the proportion of 80% by weight of phenolic heavy oil and 20% by weight of cellulose acetate, I agitate the two together at a temperature substantially in excess of 100° C., and desirably within the range of 150° C. to 200° C., until the cellulose acetate becomes dissolved in the phenolic heavy oil. The mass is then allowed to cool.

The resultant product is a plastic mass, which at room temperature is an elastic, transparent solid. The mass is thermoplastic, and becomes soft and gelatinous when its temperature is raised to a point approximating 150° C.

In accordance with this simple preferred procedure I have succeeded in making up a plastic containing as much as 27% cellulose acetate, and have succeeded in including cellulose acetate in substantially increased quantity by following the procedure of the following example.

Example No. 2

Having made up a semi-solid mass of phenolic heavy oil and cellulose acetate by agitating the two together within the temperature range of 150° C. to 200° C., I introduce the semi-solid material into heated rolls, and continue to add increments of cellulose acetate while rolling the mass until more than 30% of cellulose acetate had been included.

The resultant product was an elastic, transparent plastic, somewhat less plastic at normal room temperature than the product obtained following the unmodified procedure of Example No. 1. In degree it becomes soft and gelatinous at somewhat higher temperature than is the case with the product obtained by following without variation the procedure of Example No. 1.

It is possible to obtain a plastic or oily body having a viscosity higher than that of the phenolic heavy oil, and which is fluid, or imperfectly solid, at normal room temperature, by increasing the relative content of phenolic heavy oil with respect to the cellulose acetate. There is no lower limit of cellulose acetate inclusion to be given, since any substantial quantity of cellulose acetate dissolved in the phenolic heavy oil serves in degree to increase the viscosity of the heavy oil, and tends to render the heavy oil gelatinous in consistency. I have found that a proportion of 15% by weight of cellulose acetate to 85% phenolic heavy oil leads to the production of a semi-solid mass, plastic at normal room temperature, which is noticeably tacky.

My cellulose acetate solution in phenolic heavy oil has utility for all purposes in which a transparent plastic is desirable. In the lower range of cellulose acetate inclusion, as from 15% cellulose acetate down to a percentage inclusion at which the cellulose acetate does not to a material extent modify the character of the phenolic heavy oil, the cellulose acetate solution is useful as an adhesive of thermoplastic sort. I have found that neither the adhesive formed by a relatively small inclusion of cellulose acetate, nor the plastic formed by a maximum inclusion of cellulose acetate, becomes brittle at any commonly encountered atmospheric temperature.

I claim as my invention:

1. A composition of matter comprising a solution of cellulose acetate in an oily, viscous, alcohol soluble fluid comprising the lower molecular weight, normally liquid products formed by polymerization and phenolic interreaction in a mixture of crude solvent naphtha and a phenolic reactive with production of an alcohol soluble resinous body containing distillation separable, alcohol soluble coumarone resin and said oily fluid.

2. A composition according to claim 1, said oily fluid distilling between about 160° and 200° C. under a pressure of 1 millimeter.

3. A composition of matter in the state of a plastic solid at normal room temperature comprising a solution of cellulose acetate in an oily, viscous, alcohol soluble fluid comprising the lower molecular weight normally liquid products formed by polymerization and phenolic interreaction in a mixture of crude solvent naphtha and a phenolic reactive with production of an alcohol soluble resinous body containing distillation separable, alcohol soluble coumarone resin and said oily fluid, the composition containing said cellulose acetate in a proportion not substantially less than about 15 per cent of the combined weight of the cellulose acetate and the oily solvent.

4. A composition according to claim 3, said oily fluid distilling between about 160° and 200° C. under a pressure of 1 millimeter.

JOSEPH RIVKIN.